Oct. 23, 1962  J. M. BRADY ET AL  3,060,349
MOUNTING BRACKET FOR ELECTRICAL COMPONENTS
Filed Dec. 8, 1958

INVENTORS
JOSEPH M. BRADY
BY THOMAS C. WRIGHT

ATTORNEY

United States Patent Office 3,060,349
Patented Oct. 23, 1962

3,060,349
MOUNTING BRACKET FOR ELECTRICAL COMPONENTS
Joseph M. Brady and Thomas C. Wright, Boone, N.C., assignors to International Resistance Company, Philadelphia, Pa.
Filed Dec. 8, 1958, Ser. No. 778,745
8 Claims. (Cl. 317—99)

The present invention relates to a mounting bracket for electrical components, and more particularly to a one-piece mounting bracket for stack mounting electrical components in spaced relation.

There are many electrical components, such as resistors, which when mounted on a panel or chassis should be mounted in spaced relation to the panel or the wall of the chassis for proper cooling of the component. Also, it is often desirable to mount a plurality of such components in stacked relation, i.e one above the other and in spaced relation. For use in so mounting the electrical components, it is desirable to have a mounting bracket which permits ease of mounting on all types of surfaces, including vertical and overhead panels or walls, and which is relatively light in weight and inexpensive.

It is an object of the present invention to provide a one-piece mounting bracket for electrical components.

It is another object of the present invention to provide a one-piece mounting bracket for use in stack mounting electrical components in spaced relation.

It is still another object of the present invention to provide a one-piece mounting bracket for electrical components which permits ease of mounting the components on all types of surfaces.

It is a further object of the present invention to provide a one-piece mounting bracket for electrical components which is relatively light in weight and inexpensive to manufacture.

Other objects of the invention will appear hereinafter.

For the purpose of illustrating the invention there is shown in the drawings a form which is presently preferred; it being understood, however, that this invention is not limited to the precise arrangements and instrumentalities shown.

Figure 3:
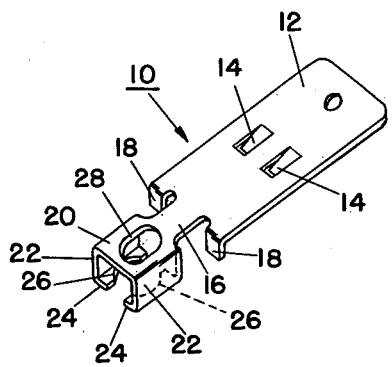
FIGURE 3 is a perspective view of the mounting bracket of the present invention.

Referring to FIGURE 3, the mounting bracket of the present invention, generally designated as 10, comprises a flat, substantially rectangular body portion 12 which has a pair of spacer fingers 14 punched out therefrom. Fingers 14 extend longitudinally of the body 12 and are bent to project downwardly below the bottom surface of the body 12. Body 12 has an integral neck 16 extending longitudinally from one end of the body 12. The end of body 12 from which neck 16 extends has a pair of integral stop lugs 18, one on either side of the neck 16. Stop lugs 18 extend downwardly from body 12 at substantially right angles to the body 12. A substantially rectangular, flat head 20 is integral with the end of neck 16. Head 20, neck 16, and body 12 are all in the same plane. Head 20 has a pair of spaced legs 22 extending downwardly therefrom at substantially right angles to the head 20, with one leg 22 being along each side of the head 20. The ends of legs 22 are bent at substantially right angles to the legs 22 to provide feet 24. Feet 24 extend toward each other with the ends of the feet 24 being spaced apart. An arcuate notch 26 is provided in the end of each foot 24. Notches 26 face each other so as to form a portion of a hole. Head 20 has an elongated hole 28 therethrough which is directly above the hole formed by notches 26. Bracket 10 is made from a single sheet of metal which is cut and bent to form the various parts thereof.

Figure 2:
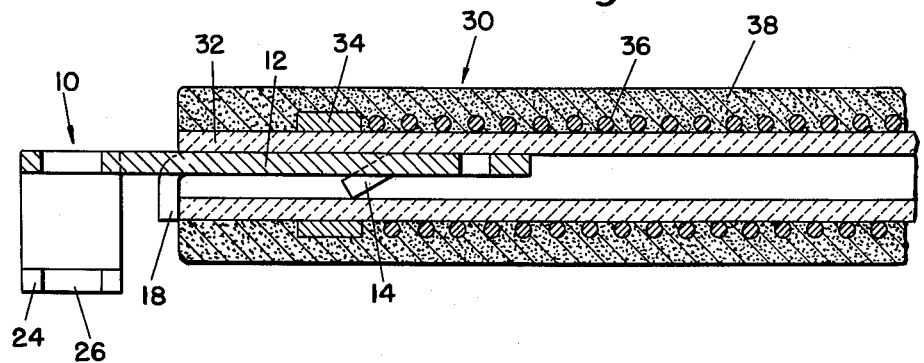
FIGURE 2 is a longitudinal sectional view of a portion of an electrical resistor having a mounting bracket of the present invention secured thereto.

FIGURE 2 shows the bracket 10 of the present invention secured to an electrical resistor, generally designated as 30.

Resistor 30 comprises a tubular core 32 of an electrical insulating material, such as a ceramic. A metal terminating band 34 surrounds core 32 adjacent one end of the core 32. An electrical resistance wire 36 is helically wound along core 32 with the end of the wire 36 being attached to the terminating band 34. A protective jacket 38 of electrical insulating material surrounds the core 32, terminating band 34, and resistance wire 36. Although only one end of resistor 30 is shown, the other end of the resistor 30 is identical to the end shown.

Body 12 of mounting bracket 10 is inserted into the core 32 until the stop lugs 18 engage the end of the core 32. The upper surface of body 12 frictionally engages one side of the inner surface of core 32, and the ends of fingers 14 frictionally engage the opposite side of the inner surface of the core 32 thereby frictionally securing the mounting bracket 10 to the resistor 30. A second mounting bracket 10 is similarly secured to the other end of the resistor 30.

Figure 1:
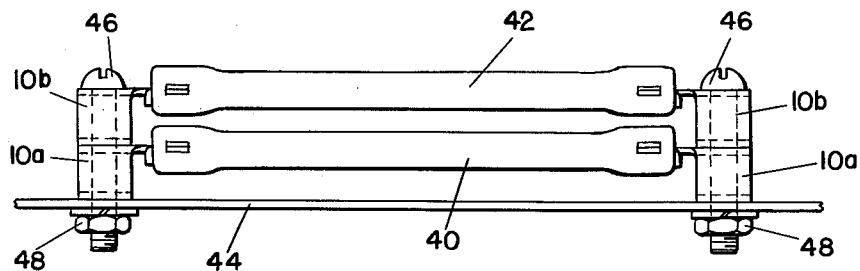
FIGURE 1 is a side elevational view of a pair of electrical components stack mounted on a panel by means of the mounting bracket of the present invention.

FIGURE 1 shows a pair of electrical components 40 and 42, such as resistor 30 shown in FIGURE 2, stack mounted on a panel 44 by the mounting brackets 10 of the present invention. Electrical component 40 with a mounting bracket 10a secured in each end thereof is placed over the panel 44 with the feet 24 of the mounting brackets 10 seated on the panel 44. Each mounting bracket 10a is positioned with the hole formed by notches 26 being over a hole, not shown, in the panel 44. The second electrical component 42 having a mounting bracket 10b secured to each end thereof is placed over the first electrical component 40 with the feet 24 of the mounting brackets 10b seated on the heads 20 of the mounting brackets 10a. Mounting brackets 10b are positioned so that the notches 26 in the feet thereof are directly over the hole 28 in the head 20 of the mounting brackets 10a. Bolts 46 are inserted through the aligned holes 28 and notches 26 in the mounting brackets 10a and 10b and the hole in the panel 44. Nuts 48 are threaded on the ends of the bolts 46 to secure the mounting brackets 10a and 10b to the panel 44.

Since the mounting bracket 10 of the present invention is a one-piece bracket and is self-secured to an electrical component, an electrical component having a mounting bracket 10 secured to each end thereof can be handled as a single unit for ease of mounting the electrical component. Also, since the mounting bracket 10 of the present invention is made from a single piece of sheet metal, it is relatively light in weight and inexpensive to manufacture.

Although the mounting bracket 10 of the present invention has been described as being used with a wire wound resistor, it can be used with other types of resistors as well as other types of electrical components which have a hole in each end thereof to permit insertion of the body 12 of the mounting bracket 10.

The present invention may be embodied in other specific forms without departing from the spirit or essential attributes thereof and, accordingly, reference should be made to the appended claims, rather than to the foregoing specification as indicating the scope of the invention.

We claim:
1. An electrical component having an opening in each end thereof, and a separate one-piece metal mounting bracket secured in each end of said component, each of said mounting brackets comprising a flat, substantially rectangular body, a finger extending longitudinally also said body and projecting beyond a surface of said body, a neck extending from one end of said body, a substantially rectangular head on the end of said neck, a pair of spaced legs extending in the same direction from said head, said legs extending from opposite sides of said head, a foot extending from the end of each leg, said feet extending toward each other, a notch in the end of each foot, and a hole in said head over said notches, the body of each of said bracket extending into the opening in said component with the body frictionally engaging one side of said wall of said opening and the finger frictionally engaging the opposite side of the opening, and the head of each of said brackets being adjacent the end of said component.

2. An arrangement in accordance with claim 1 in which each of said brackets has a lug extending from said one end of the body, and the lug engages the end of said component.

3. A stacked assembly of electrical components comprising a panel having a pair of spaced holes therethrough, a pair of electrical components, each of said components having an opening in each end thereof, a separate one-piece metal mounting bracket secured in each end of each of said components, each of said mounting brackets comprising a flat, substantially rectangular body, a finger extending longitudinally along said body and projecting beyond a surface of said body, a neck extending from end of said body, a substantially rectangular head on the end of said neck, a pair of spaced legs extending in the same direction from said head, said legs extending from opposite sides of said head, a foot extending from the end of each leg, said feet extending toward each other, a notch in the end of each foot, and a hole in said head over said notches, the body of each of said brackets extending into the opening in said component with the body frictionally engaging one side of the wall of said opening and the finger frictionally engaging the opposite side of the wall of the opening, and the head of each of said brackets being adjacent the end of said component, one of said components having the feet of its bracket seated on said panel with the notches in the feet being over the holes in said panel, the other component having the feet of its brackets seated on the heads of the brackets of the one component with the notches in the feet being over the holes in the underlying heads, and a separate bolt extending through each set of aligned holes and notches and through the holes in the panel to secure the brackets to the panel.

4. A mounting bracket for an electrical component comprising a flat metal body, a flat head integral with and extending longitudinally from one end of said body, a pair of spaced legs integral with and extending in the same direction from said head, said legs extending from opposite sides of said head, a foot integral with the end of each of said legs, said feet extending toward each other parallel to said head, a notch in the end of each foot, said notches being opposed to each other, a hole in said head over said notches, and a pair of spaced fingers extending longitudinally along said body and projecting beyond a surface of said body, each of said fingers having one end integral with said body.

5. A mounting bracket for an electrical component comprising a flat metal body, a flat head integral with and extending longitudinally from one end of said body, a pair of spaced legs integral with and extending in the same direction from said head, said legs extending from opposite sides of said head, a foot integral with the end of each of said legs, said feet extending toward each other parallel to said head, a notch in the end of each foot, said notches being opposed to each other, a hole in said head over said notches, and a lug integral with said one end of said body and extending substantially perpendicularly from said body.

6. A one-piece metal mounting bracket for an electrical component comprising a substantially flat rectangular body, a neck extending from one end of said body, a substantialy rectangular head on the end of said neck, said body, neck and head all lying in the same plane, a pair of spaced legs extending in the same direction from said head and being perpendicular to said head, said legs extending from opposite sides of said head, a foot extending from the end of each leg, said feet extending toward each other parallel to said head, a notch in the end of each foot, said notches being opposed to each other, a hole in said head over said notches, and a pair of spaced fingers extending longitudinally along said body and projecting beyond a surface of said body, each of said fingers having one end integral with said body.

7. A mounting bracket in accordance with claim 6 including at least one lug extending from said one end of said body substantially perpendicular to said body.

8. A mounting bracket in accordance with claim 6 including a pair of lugs extending from said one end of said body substantially perpendicularly to said body, said lugs being on opposite sides of said neck.

References Cited in the file of this patent

UNITED STATES PATENTS

| 1,933,564 | Neff | Nov. 7, 1933 |
| 2,109,073 | Nieman | Feb. 22, 1938 |
| 2,223,172 | George | Nov. 26, 1940 |
| 2,347,713 | Rogoff | May 2, 1944 |
| 2,477,653 | Roane | Aug. 2, 1949 |
| 2,499,296 | Buchanan | Feb. 28, 1950 |
| 2,680,235 | Pierce | June 1, 1954 |
| 2,790,963 | Batcheller | Apr. 30, 1957 |
| 2,814,026 | Broske | Nov. 19, 1957 |
| 2,938,190 | Krehbiel | May 24, 1960 |
| 2,987,697 | Davis | June 6, 1961 |

FOREIGN PATENTS

| 656,029 | Great Britain | Aug. 8, 1951 |